(No Model.)  3 Sheets—Sheet 1.

F. H. PALMER.
SOLDERING MACHINE.

No. 503,159.  Patented Aug. 15, 1893.

WITNESSES:
J. M. Criswell
C. Sedgwick

INVENTOR
F. H. Palmer
BY
Munn & Co
ATTORNEYS.

(No Model.)  3 Sheets—Sheet 2.

F. H. PALMER.
SOLDERING MACHINE.

No. 503,159.  Patented Aug. 15, 1893.

WITNESSES:

INVENTOR
F. H. Palmer
BY Munn & Co.
ATTORNEYS.

(No Model.)  3 Sheets—Sheet 3.
F. H. PALMER.
SOLDERING MACHINE.
No. 503,159. Patented Aug. 15, 1893.
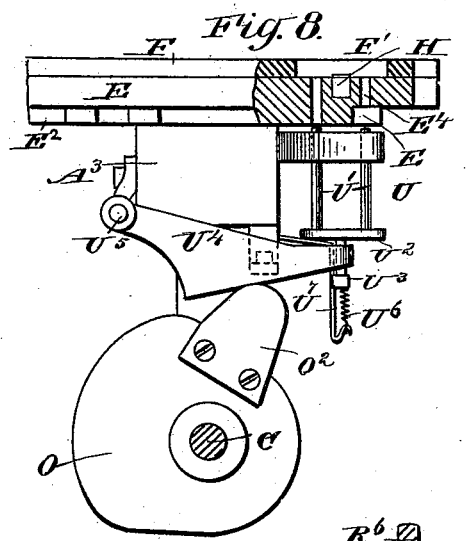
Fig. 8.
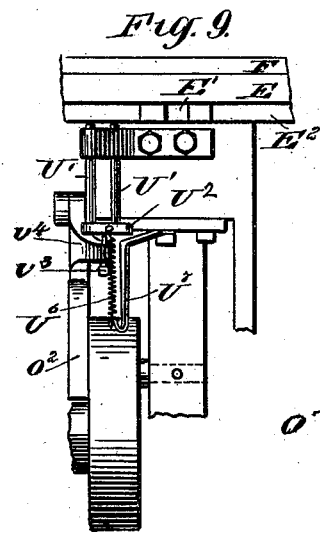
Fig. 9.
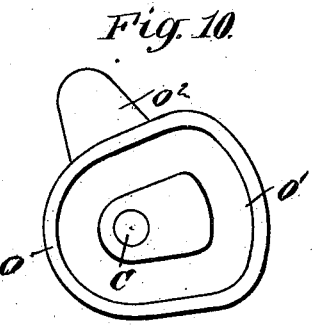
Fig. 10.
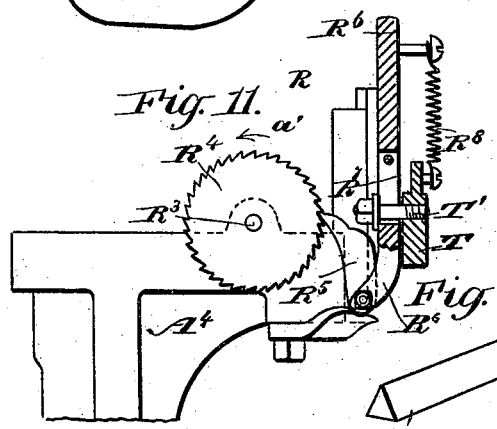
Fig. 11.
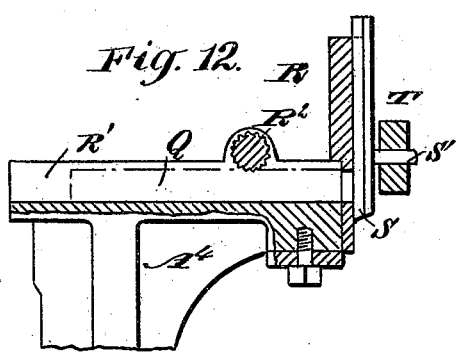
Fig. 12.
Fig. 13.
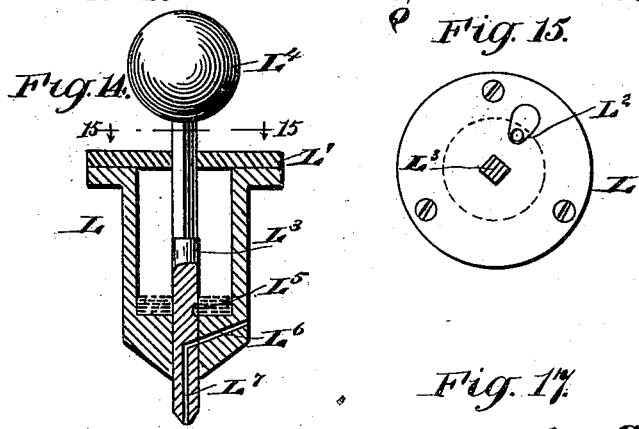
Fig. 14. Fig. 15.
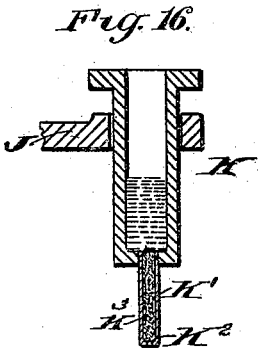
Fig. 16.
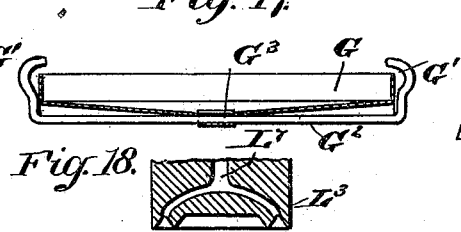
Fig. 17. Fig. 18.
WITNESSES:
J. A. Criswell
C. Sedgwick
INVENTOR
F. H. Palmer
BY Munn & Co
ATTORNEYS.

UNITED STATES PATENT OFFICE.

FRANK H. PALMER, OF BROOKLYN, NEW YORK.

SOLDERING-MACHINE.

SPECIFICATION forming part of Letters Patent No. 503,159, dated August 15, 1893.

Application filed February 27, 1892. Renewed January 16, 1893. Serial No. 458,625. (No model.)

*To all whom it may concern:*

Be it known that I, FRANK H. PALMER, of Brooklyn, in the county of Kings and State of New York, have invented a new and Improved Soldering-Machine, of which the following is a full, clear, and exact description.

The invention relates to can soldering machines, and its object is to provide a new and improved soldering machine which is simple and durable in construction, very effective and automatic in operation, and arranged to quickly and securely fasten the two parts to be united, the machine being more especially designed for soldering bails to covers, or covers to the can bodies, and for other purposes.

The invention consists principally of a disk having an intermittent rotary motion and formed with a series of openings arranged in a circle, the openings being adapted to receive the articles to be soldered, and a soldering pot provided with a valve forming a soldering iron and adapted to pass into the openings to solder the articles together.

The invention further consists of a soldering pot provided with a valve fitted to slide and forming a soldering iron.

The invention further consists of a soldering pot containing molten metal, and a valve forming a soldering iron fitted to slide in the said pot and provided with an opening at the soldering end, the valve being also formed with a recess adapted to register with the interior of the pot to carry the molten metal to a resting place for delivery to the said opening so that the solder finally passes to the point of the soldering iron.

The invention also consists of a soldering pot and a cutting device for cutting chips from a block of metal, the said chips dropping into the said soldering pot to keep the latter constantly charged with a desired, predetermined quantity of molten metal.

Reference is to be had to the accompanying drawings, forming a part of this specification, in which similar letters of reference indicate corresponding parts in all the figures.

Figure 1:
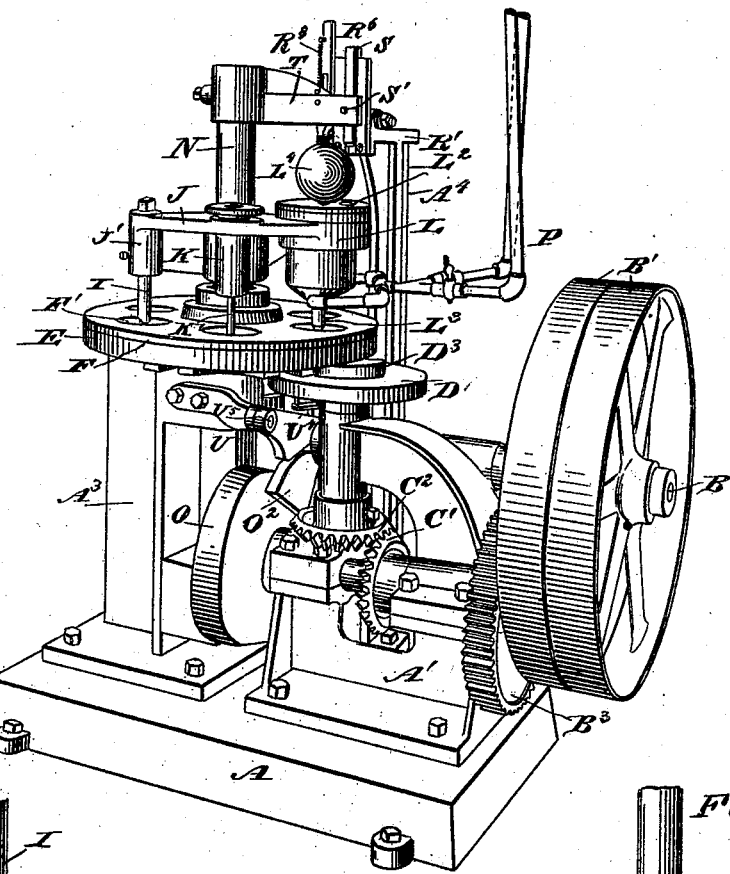
Figure 5:
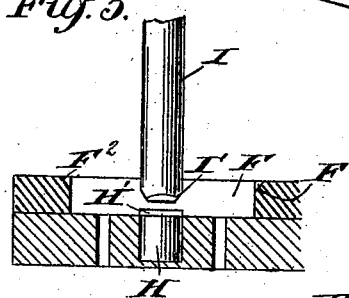
Figure 6:
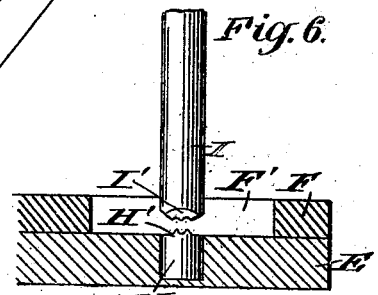
Figure 4:
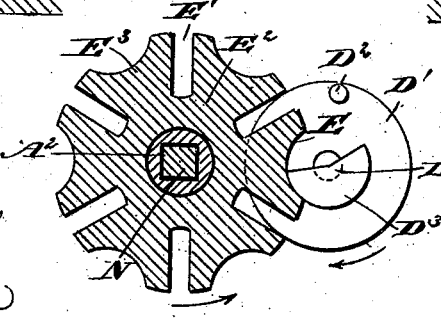
Figure 7:
Figure 2:
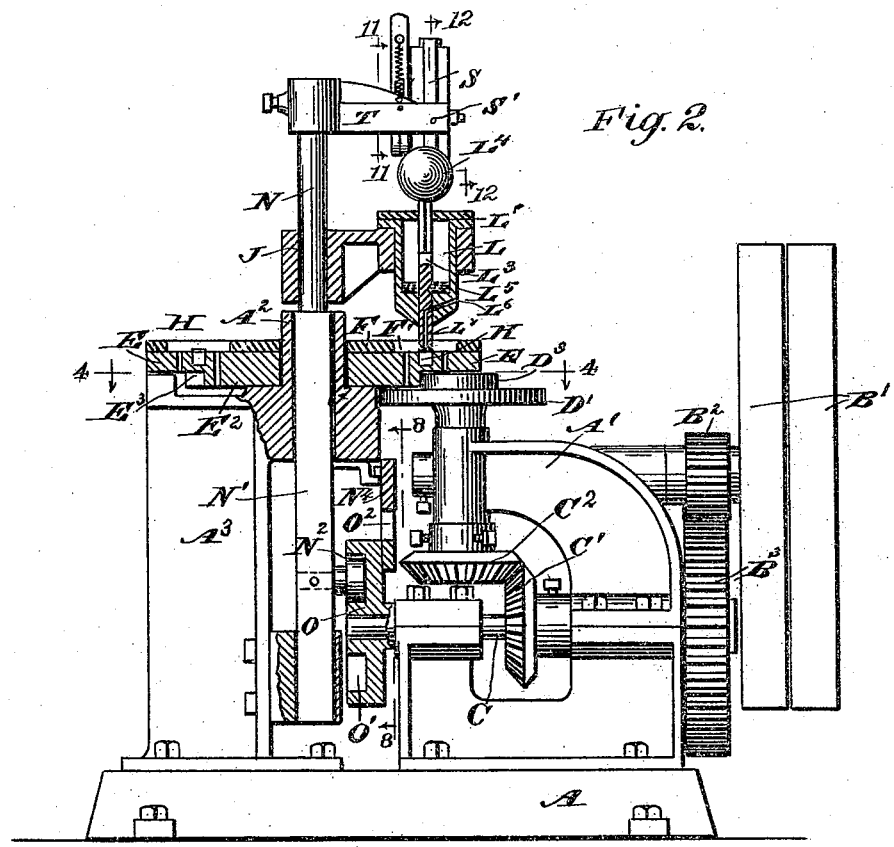
Figure 3:
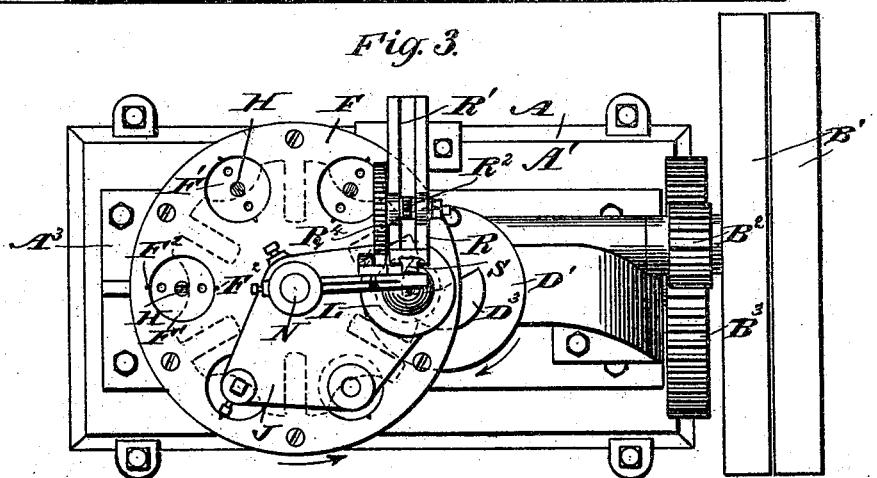

Figure 1 is a perspective view of the improvement. Fig. 2 is a sectional side elevation of the same. Fig. 3 is a plan view of the same. Fig. 4 is a sectional plan view of part of the same on the line 4—4 of Fig. 2. Fig. 5 is an enlarged sectional side elevation of the disk and the die for pressing articles in position. Fig. 6 is a transverse section of the same. Fig. 7 is a sectional side elevation of part of the bail and cover to be united. Fig. 8 is a transverse section of part of the improvement on the line 8—8 of Fig. 2. Fig. 9 is a rear side view of the same. Fig. 10 is a face view of the cam for operating the soldering pot, the acid pot, and the die, and also the cutting mechanism. Fig. 11 is an enlarged transverse section of the cutting mechanism on the line 11—11 of Fig. 2. Fig. 12 is a similar view of the same on the line 12—12 of Fig. 2. Fig. 13 is a perspective view of the bar of soldering metal. Fig. 14 is an enlarged sectional side elevation of the soldering pot. Fig. 15 is a sectional plan view of the same on the line 15—15 of Fig. 14. Fig. 16 is an enlarged sectional side elevation of the acid pot. Fig. 17 is a sectional side elevation of the cover and bail as fastened together; and Fig. 18 is a sectional side elevation of a modified form of the soldering iron.

The improved soldering machine is mounted on a suitably constructed base A, on which is erected a frame A', carrying the main driving shaft B, provided at its outer end with fast and loose pulleys B', connected by belt with suitable machinery for imparting a rotary motion to the said shaft B. On the latter is secured a pinion $B^2$, in mesh with a larger gear wheel $B^3$, secured on the outer end of a shaft C extending longitudinally and mounted to turn in suitable bearings held on the frame A'. On the shaft C is secured a bevel gear wheel C', in mesh with a bevel gear wheel $C^2$ attached to the lower end of a vertically arranged shaft D, also mounted in suitable bearings in the frame A'. On the upper end of the shaft is secured a disk D' formed on its upper face and near its periphery, with a pin $D^2$ adapted to engage alternately a series of radial slots E' formed in a circular offset $E^2$ arranged on the under side of a disk E, adapted to carry the articles to be united. The circular offset $E^2$ of the disk E, is formed between the slots E', at its periphery, with segmental recesses $E^3$ adapted to be engaged by a segmental disk $D^3$ attached to the top face of the disk D' and extending concentrical to the same. The segmental disk $D^3$ is arranged, relative to the pin $D^2$, in such a manner that the pin $D^2$ engages one of the slots $E'$ by the time the segmental disk $D^3$ leaves the segmental recess $E^3$ and again engages the next segmental recess $E^3$ at the time the pin $D^2$ leaves the slot, so that the disk E,—during the time the pin $D^2$ is not engaged in one of its slots and does not move the disk,—is locked in position by the segmental disk $D^3$ engaging the corresponding recess $E^3$. It will be seen that by this arrangement an intermittent rotary motion is given to the disk E, the latter being securely locked in position during the time it remains still.

The disk E is mounted to turn loosely on a hub $A^2$ formed on a frame $A^3$ also secured on the base A opposite the frame $A'$. On top of the disk E is secured, by screws or other means, a plate F of the same diameter and formed with a series of openings $F'$ arranged in a circle and adapted to receive the cover G, or other article to be soldered. If the machine is used for fastening a bail to the cover, such, for instance, as is shown in United States Patent No. 462,154, granted to me October 27, 1891, the opening $F'$ in the plate F is of a size to receive the cover G, the ends $G'$ of the bail $G^2$ resting in grooves $F^2$ formed in the sides of the opening as will be plainly seen by reference to Figs. 3 and 5. The middle part of the bail $G^2$ is engaged by a U-shaped clip $G^3$, the free ends of which extend through the cover, as is plainly illustrated in Fig. 7, the said ends being adapted to be bent over and soldered in place on the cover to securely fasten the bail in place, as hereinafter more fully described.

In the disk E is arranged a series of dies H, located concentric with the openings $F'$ and arranged in the middle of the same, the upper, projecting ends $H'$ of each die being formed with recesses to receive the lower end of the clip $G^3$ when the cover G is in place in the respective opening $F'$. The free ends of the clip $G^3$ are then engaged by the lower end $I'$ of a male die I, having a vertical movement so as to engage the free ends of the clip $G^3$ to press the free ends apart and upon the top of the cover, as indicated in dotted lines in Fig. 7.

The male die I is secured in a socket $J'$ of a plate J also carrying the acid pot K and the soldering pot L, the said socket $J'$, and the pots K and L being arranged in a circle corresponding to the circle in which the openings $F'$ are located. The die I, the acid pot K, and the soldering pot L are located the same distance apart as and directly above three succeeding apertures $F'$.

The plate J is secured on a post N formed with the square part $N'$ extending centrally through the hub $A^2$ and through the frame $A^3$, which latter thus forms a bearing for the said part $N'$, the latter being mounted to slide vertically in the said bearings and being provided for this purpose with a friction roller $N^2$ traveling in a cam groove $O'$ of a cam wheel O secured on the inner end of the shaft C previously mentioned. The cam groove $O'$, as shown in Fig. 10, is arranged in such a manner that during about one half of a revolution of the shaft C, the post $N'$ remains stationary, and during the remaining half the post is raised to a suitable height and moved down again to a normal position for the purpose hereinafter more fully described.

The acid pot K, shown in detail in Fig. 16, is provided with a suitable vessel containing acid and carrying in its bottom a tube $K'$ formed at the lower end with an opening $K^2$ through which the acid can pass in drops to the point to be soldered. In the tube $K'$ is preferably arranged a wick $K^3$ to regulate the amount of acid passing from the pot to the opening $K^2$. The soldering pot L is formed with a suitable vessel containing a quantity of molten metal, the pot being constantly heated by a suitable burner P of any approved construction, preferably a hydrocarbon burner of any desired pattern. The pot L is provided with a suitable cover $L'$ formed with an opening $L^2$ through which drop the chips of metal to be melted and used for soldering purposes, as hereinafter more fully described.

In the pot L is arranged to slide vertically a valve $L^3$, extending through the cover $L'$ and carrying, at its outer, upper end, a ball $L^4$, or other weight to hold the valve in a lowermost position and to engage the lower pointed soldering end with the article to be soldered, as hereinafter more fully described. In one side of the valve $L^3$ is arranged a recess $L^5$ adapted to register with the interior of the pot L when the valve $L^3$ is moved in an uppermost position, as shown in Fig. 14, and the said recess $L^5$ is also adapted to register with an opening $L^6$ formed in the side of the pot and leading from the outside to the seat of the valve in the lower end of the pot. This aperture $L^6$ is adapted to register with an opening $L^7$ arranged in the lower, soldering end of the valve $L^3$, at the time the valve $L^3$ is in an uppermost position, as shown in Fig. 14. Now, when the valve is in this position, the molten metal in the pot fills the recess $L^5$, and when the valve slides downward the molten metal in the recess $L^5$ is carried off to the opening $L^6$ and is deposited therein, and when the valve $L^3$ again rises the opening $L^7$ is brought into register with the opening $L^6$, and the molten metal contained therein flows down the said opening $L^7$ to the soldering end of the valve to be deposited on the two parts to be united. Thus it will be seen that the same desired quantity of molten metal is always taken from the pot by the valve $L^3$ and delivered to the soldering end of the valve, as described, it being understood that the valve forms a soldering iron.

The chips of the soldering metal to be passed through the opening $L^2$ in the soldering bar L, are cut from a block Q, preferably of triangular shape, as illustrated in Fig. 13, and made of a suitable alloy for soldering purposes. This block Q is placed in a transversely extending guide-way R' forming part of a cutting mechanism R, and supported on a frame $A^4$ held on the rear of the base A. The apex of the block Q is engaged by a toothed wheel $R^2$ journaled in the guide-ways R' and embedding its teeth in the soft soldering metal of the bar Q, so that when the wheel $R^2$ is revolved the block Q is moved forward in the guide-way R'.

The front end of the block Q is adapted to be engaged by a knife S for cutting a chip from the end of the block, the said chip dropping down into the opening $L^2$ as the knife S is located directly above the said opening, as will be plainly seen by reference to Figs. 1 and 3. The knife S is mounted to slide and is provided with a pin S' engaging an arm T, secured on the upper end of the post N, so that when the latter moves downward, as above described, the knife S is moved in a like direction and its lower, cutting edge cuts off a chip from the projecting end of the block Q.

In order to impart a rotary motion to the wheel $R^2$ so as to feed the block Q, the following device is provided; which is more particularly illustrated in Figs. 11 and 12: on the shaft $R^3$ of the wheel $R^2$ is secured a ratchet wheel $R^4$, engaged by a pawl $R^5$ pivoted on the lower end of a slide $R^6$, fitted to slide in suitable bearings on the front of the guide-way R' and parallel to the shaft S. In the slide $R^6$ is arranged a vertical groove $R^7$ into which projects a bolt T' screwing in the arm T previously mentioned, so that the upward movement of the latter carries the slide $R^6$ in the same direction, thus raising the pawl $R^5$ and thereby imparting a rotary motion to the ratchet wheel $R^4$ and consequently to the wheel $R^2$ in the direction of the arrow a'. This movement imparts a forward feed to the bar Q.

In order to insure a downward movement of the slide $R^6$, a spring $R^8$ is employed, connected by one end with a screw projecting from the slide $R^6$ and attached at its other end to the arm T. By engaging the pin T' with the slot $R^7$ the feed given by the pawl $R^5$ to the ratchet wheel $R^4$ can be conveniently regulated, so that a heavier or lighter chip is cut off from the end of the block Q according to the amount of solder used in the pot L. It will be seen that by this device the molten metal in the pot L always remains at the same level and consequently the metal can be kept at the proper temperature at all times on account of having a like quantity of metal always in the said pot.

In order to remove the finished article from the disk E a discharging device U is provided, arranged on the under side of the disk E, in the rear of the soldering pot L, and adapted to operate at the time the disk E is at a standstill, as hereinbefore mentioned. This discharging device U is provided with two vertically arranged rods or plungers U' mounted to slide in a suitable bracket projecting from the frame $A^3$ see Figs. 8 and 9, the lower ends of the rods or plungers being connected by a plate $U^2$ adapted to rest at the under side on a set screw $U^3$, screwing in the free end of a lever $U^4$ pivoted at $U^5$ to the frame $A^3$. The lever $U^4$ extending transversely, is adapted to be engaged at its under side by a cam arm $O^2$ secured in the inner face of the cam wheel O, secured on the shaft C, as previously mentioned. A spring $U^6$ is connected with the plate $U^2$ and also with a bracket $U^7$ projecting from the frame $A^3$, the said spring serving to draw the bar $U^2$ and its rods or plungers U' into a lowermost position; that is, to hold the same always in contact with the upper end of the set screw $U^3$. The upper ends of the rods or plungers U' are adapted to pass through openings $E^4$ in the plate E into the opening F' in the plate F, so as to engage the article located in the said opening and resting on top of the plate E, from the under side, to finally force the article out of the opening in order to discharge the same from the disk. The cam arm $O^2$ acts on the lever $U^4$ to swing the same upward at the time the disk E is at a stand still so that the plungers or rods U' pass upward into the then registering openings $E^4$, to dislocate the finished article held in the opening F' of the plate F. The rods or plungers U' return to their normal, lowermost position previous to the next forward rotary motion of the disk E, so that the said rods or plungers are disengaged from the openings $E^4$ at the time the disk moves forward.

The operation is as follows: The operator is seated at one side of the machine near the two openings F' not used by any of the devices described, so as to conveniently place the article to be soldered in the empty openings as the disk E revolves. The operator inserts the cover G with the bail $G^2$ in place and the clip $G^3$ engaging the bail from underneath, as illustrated in Fig. 7, so that the cover rests on top of the plate E within the opening F', the ends G' of the bail resting in the notches $F^2$ so that the cover is held in place, is prevented from turning and at the same time the lower end of the clip $G^2$ is properly seated on the top H' of the female die H. When the cover is in this position and the disk E revolves, so that the cover is brought directly below the male die I, then the rotation of the disk E ceases for the time being. The cam wheel O, by means of its cam groove O' engaging the friction roller $N^2$ moves the post N downward, so that the die I presses the free ends of the clip G apart and throws the said free ends in opposite directions on the cover, as is shown in dotted lines in Fig. 7. The cam wheel O then causes the post N to rise, so as to move the arm J and its several devices upward, above the plate F, after which the disk E again travels forward, so that the cover, with the bent clip $G^2$, passes directly below the acid pot K.

The disk E remains at a standstill, and during this time the plate J again moves downward by the downward stroke of the post N, as above described, so that the lower end of the tube K' of the acid pot K passes acid over the bent parts of the clip and also over part of the bail and part of the cover adjacent to the bent over parts of the clip. The post N then again rises, carrying the plate J in an upward direction and the tube K' out of the aperture F' away from the cover therein. The disk E then again revolves until the cover with the bent over clip and the acid thereon, moves directly under the solder pot L to remain at a stand still during the time the plate J again travels downward to bring the soldering end of the valve $L^3$ into contact with the parts of the cover on which the acid is deposited. When the pointed end of the valve $L^3$ rests on the cover between the turned over clip ends $G^3$, then the plate J travels still farther downward, so that the valve $L^3$ rises within the acid pot to the position shown in Fig. 14, whereby the molten metal deposited in the aperture $L^6$ passes through the opening $L^7$ and down upon the clip part of the bail and cover to solder the several parts together in the usual manner. When the plate J again rises, the pot L travels upward, the valve $L^3$ then standing still temporarily, until the ball of the weight $L^4$ is seated on top of the cover L' of the pot. During this motion of the pot the recess $L^5$ in the valve $L^3$ takes part of the molten metal to the opening $L^6$, the opening $L^7$ then being disconnected from the opening $L^6$. On the further upward rising of the plate J the pot L and its valve $L^3$ are carried upward to finally move the lower end of the valve out of the opening F' away from the soldered cover. The disk E then again moves forward to bring the cover over the discharging device U. The latter is then actuated by the cam arm $O^2$ so that the rods or plungers U' enter the openings $E^4$ and press on the under side of the cover to lift the latter out of the opening F'. The operator then takes hold of the finished cover to remove the same from the machine.

It will be seen that during the operation above described, one cover is discharged by the discharging device U while, at the same time, the second cover is soldered by the soldering pot L, and at the same time a third cover receives a charge of acid from the acid pot K, while another cover is simultaneously treated by the dies I and H in the manner above described. The operator continually places covers, bails and clips into the openings F' as the disk E revolves. Thus, at every revolution of the shaft C, the soldering device, the acid device, the dies and the discharging device U are actuated simultaneously, each performing its functions as above described. It will be further seen that at every full stroke of the post N, the cutting device R is actuated, so that a chip is cut off from the block Q, the cut off chip corresponding in quantity to the amount of molten metal carried from the pot to the article to be soldered, so that the same level of molten metal is always maintained within the pot L, as previously described.

As shown in Fig. 3, the plate F is provided with six apertures F', and a like number of slots E' is formed on the offset $E^2$ of the disk E, so that during one third of the revolution of the shaft C and D the disk E is given one sixth turn, while during the remainder of the revolution of the shafts C and D, the said disk E remains stationary. Thus, ample time is given for the dies I and H, the acid pot K, the soldering device L and the discharging device U to perform their duties in the manner above described, and also to enable the performer to conveniently remove the finished cover and to insert a new one in one of the openings F', as described.

It will be understood that by changing the shapes of the dies I and H and the soldering end of the valve $L^3$, articles of different construction can be readily soldered together in precisely the same manner as above described. As shown, for instance, in Fig. 18, the lower end of the valve $L^3$ is made circular, having in its under side a circular groove connected by branch openings with the opening $L^7$ to pass molten metal to the circular groove to solder circular seams or cans, covers, and other articles. It is understood that in this case the tube K' is formed similarly at its lower end so as to pass it into the circular seam.

The plate F, which forms part of the disk E, is made removable, so that a like plate with different sized openings F', for other articles, can be attached to the disk E. For instance for covers of jars of smaller diameter, plates F with different sized openings are attached to the disk E so that the covers are properly held in position in the same sized openings F'.

Having thus described my invention, what I claim as new, and desire to secure by Letters Patent, is—

1. A soldering machine comprising a disk having an intermittent rotary motion and formed with a series of openings arranged in a circle and adapted to receive the articles to be soldered, and a soldering pot for containing the solder and provided with a movable valve forming a soldering iron adapted to pass into the said openings to solder the parts together, substantially as shown and described.

2. A soldering machine provided with a soldering pot for containing the molten metal and a valve fitted to slide in the said pot and arranged to carry the molten solder from the pot to the article to be soldered, the end of the valve forming both a delivery for the molten solder and a soldering iron for soldering the part as soon as the solder is delivered, substantially as shown and described.

3. A soldering machine provided with a soldering pot containing the molten metal, and a valve forming a soldering iron and fitted to slide in the said pot, the said valve being provided at its soldering end with an opening, and being also formed with a recess adapted to register with the interior of the pot to carry the molten metal to a resting place in the pot for delivery to the said opening, which finally carries the solder to the point of the soldering iron, substantially as shown and described.

4. A soldering machine provided with a soldering pot containing the molten metal and formed with an inclined opening and a valve forming a soldering iron and fitted to slide in the said soldering pot, the valve being provided at its soldering end with an opening and being also formed with a recess adapted to register with the interior of the pot and with the opening in the pot, to carry the molten metal from the interior of the pot to the said opening which is also adapted to register with the opening in the soldering end of the valve, substantially as shown and described.

5. A soldering machine provided with a soldering pot containing the molten metal and formed with an inclined opening and a valve forming a soldering iron and fitted to slide in the said soldering pot, the valve being provided at its soldering end with an opening and being also formed with a recess adapted to register with the interior of the pot and with the opening in the pot, to carry the molten metal from the interior of the pot to the said opening which is also adapted to register with the opening in the soldering end of the valve, and a weight held on the upper end of the said soldering valve, substantially as shown and described.

6. In a soldering machine the combination with a disk having an intermittent rotary motion and formed with a series of openings arranged in a circle and adapted to receive the cover to be soldered, each opening being formed with grooves for the reception of the bail, a female die held in each opening at the center thereof and formed on top with a recess to receive the clip, and a male die mounted to slide vertically and adapted to act in conjunction with the said female die to press the free ends of the clip apart and upon the cover, substantially as shown and described.

7. A soldering machine comprising a disk having an intermittent rotary motion and formed with a series of openings arranged in a circle, adapted to receive the articles to be soldered, of an acid pot arranged to slide vertically and adapted to pass acid onto the articles in the said opening, and a soldering pot arranged to slide with the said acid pot and adapted to solder the articles together after the acid has been deposited, substantially as shown and described.

8. In a soldering machine, the combination with a disk having an intermittent rotary motion and formed with a series of openings arranged in a circle and adapted to receive the articles to be soldered, of a plate mounted to slide vertically, a male die held on the said plate and adapted to operate in conjunction with a female die in the openings of the said disk, an acid pot held in the said plate and adapted to pass acid on the articles to be soldered, and a soldering pot provided with a sliding valve forming a soldering iron and adapted to carry the molten metal to the soldering point of the iron, the said male die, the acid pot and soldering pot, being arranged in a circle corresponding to the circle in which the openings in the disk are arranged, substantially as shown and described.

9. In a soldering machine, the combination with a disk having an intermittent rotary motion and formed with a series of openings arranged in a circle and adapted to receive the articles to be soldered, of a plate mounted to slide vertically, a male die held on the said plate and adapted to operate in conjunction with a female die in the openings of the said disk, an acid pot held in the said plate and adapted to pass acid on the articles to be soldered, a soldering pot provided with a sliding valve forming a soldering iron and adapted to carry the molten metal to the soldering point of the iron, the said male die, the acid pot and soldering pot, being arranged in a circle corresponding to the circle in which the openings in the disk are arranged, and means, substantially as described, for imparting an intermittent rotary motion to the said disk, and a vertical sliding motion to the said plate, as set forth.

10. In a soldering machine, the combination with a disk having an intermittent rotary motion and formed with a series of openings arranged in a circle and adapted to receive the articles to be soldered, of a plate mounted to slide vertically, a male die held on the said plate and adapted to operate in conjunction with a female die in the openings of the said disk, an acid pot held in the said plate and adapted to pass acid on the articles to be soldered, a soldering pot provided with a sliding valve forming a soldering iron and adapted to carry the molten metal to the soldering point of the iron, the said male die, the acid pot and soldering pot, being arranged in a circle corresponding to the circle in which the openings in the disk are arranged, and a discharging device, substantially as described, and adapted to discharge the finished article from the respective opening in the disk, as set forth.

11. In a soldering machine, the combination with a disk having an intermittent rotary motion and formed with a series of openings arranged in a circle and adapted to receive the articles to be soldered, of a plate mounted to slide vertically, a male die held on the said plate and adapted to operate in conjunction with a female die in the openings of the said disk, an acid pot held in the said plate and adapted to pass acid on the articles to be soldered, and a soldering pot provided with a sliding valve forming a soldering iron and adapted to carry the molten metal to the soldering point of the iron, the said male die, the acid pot and soldering pot, being arranged in a circle corresponding to the circle in which the openings in the disk are arranged, a discharging device, substantially as described, and adapted to discharge the finished article from the respective opening in the disk, and means, substantially as described for imparting an intermittent rotary motion to the said disk and a vertical sliding motion to the said plate, as set forth.

FRANK H. PALMER.

Witnesses:
THEO. G. HOSTER,
C. SEDGWICK.